(12) United States Patent
Myers et al.

(10) Patent No.: US 11,552,698 B2
(45) Date of Patent: *Jan. 10, 2023

(54) SYSTEM AND METHOD FOR DOWNLINK SCHEDULING THAT OPTIMIZES DOWNLINK (DL) CAPACITY

(71) Applicant: Totum Labs, Inc., San Diego, CA (US)

(72) Inventors: Theodore Jon Myers, San Diego, CA (US); Matthew Zacchariah Hughes, San Diego, CA (US)

(73) Assignee: Totum Labs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,557

(22) Filed: Sep. 13, 2021

(65) Prior Publication Data
US 2021/0409108 A1    Dec. 30, 2021

Related U.S. Application Data

(63) Continuation of application No. 16/845,883, filed on Apr. 10, 2020, now Pat. No. 11,121,763.

(51) Int. Cl.
*H04B 7/185* (2006.01)
*H04W 72/04* (2009.01)
(Continued)

(52) U.S. Cl.
CPC .... *H04B 7/18513* (2013.01); *H04W 72/0446* (2013.01); *H04W 72/0486* (2013.01); *H04B 1/69* (2013.01); *H04W 84/06* (2013.01)

(58) Field of Classification Search
CPC . H04B 7/18513; H04B 1/69; H04W 72/0446; H04W 72/0486; H04W 84/06
See application file for complete search history.

(56) References Cited

U.S. PATENT DOCUMENTS

| | | | |
|---|---|---|---|
| 8,675,711 B1 * | 3/2014 | McDermott | H04B 7/18517 375/146 |
| 10,951,357 B1 | 3/2021 | Myers et al. | |

(Continued)

OTHER PUBLICATIONS

Detailed specifications of radio interfaces for the satellite component of International Mobile Telecommunications—2000 (IMT-2000), Jan. 2010, ITU-R M. 1850 (Year: 2010), 176 pages.

(Continued)

*Primary Examiner* — Tejis Daya
(74) *Attorney, Agent, or Firm* — Foley & Lardner LLP

(57) ABSTRACT

An illustrated embodiment disclosed herein is a method for downlink scheduling. The method includes scheduling, by a satellite, one or more protocol data units (PDUs) in a slot, determining, by the satellite, whether available capacity of the slot is less than a predetermined threshold, responsive to determining that the available capacity of the slot is not less than the predetermined threshold, scheduling, by the satellite, a second one or more PDUs in the slot, and responsive to determining that the available capacity of the slot is less than that the predetermined threshold, transmitting, by the satellite, the slot to an endpoint. In some embodiments, the one or more PDUs are associated with a first spreading factor (SF). In some embodiments, the first SF is lower than a second SF. In some embodiments, the second one or more PDUs are associated with the second SF.

20 Claims, 12 Drawing Sheets

(51) Int. Cl.
*H04B 1/69* (2011.01)
*H04W 84/06* (2009.01)

(56) References Cited

U.S. PATENT DOCUMENTS

| | | | |
|---|---|---|---|
| 10,998,966 B1* | 5/2021 | Myers | H04W 80/02 |
| 2001/0046220 A1 | 11/2001 | Koo et al. | |
| 2002/0071407 A1* | 6/2002 | Koo | H04L 1/1887 |
| | | | 370/335 |
| 2008/0198763 A1 | 8/2008 | Fischer et al. | |
| 2009/0238248 A1* | 9/2009 | Myers | H04W 56/0035 |
| | | | 375/E1.002 |
| 2011/0080972 A1 | 4/2011 | Xi et al. | |
| 2020/0028541 A1 | 1/2020 | Myers et al. | |

OTHER PUBLICATIONS

Foreign Search Report on PCT PCT/US2021/024936 dated Jul. 8, 2021, 7 pages.

* cited by examiner

SYSTEM AND METHOD FOR DOWNLINK SCHEDULING THAT OPTIMIZES DOWNLINK (DL) CAPACITY

CROSS-REFERENCE TO RELATED APPLICATION

This application is related to and claims priority under 35 U.S. § 120 as a continuation of U.S. Utility application Ser. No. 16/845,883, filed Apr. 10, 2020, titled "SYSTEM AND METHOD FOR DOWNLINK SCHEDULING THAT OPTIMIZES DOWNLINK (DL) CAPACITY," the entire contents of which are incorporated herein by reference for all purposes.

BACKGROUND

Doppler Multichannel Spread Spectrum (DMSS) is a new technology that addresses the connectivity needs of the tremendously large Global Asset Tracking and Monitoring Market. DMSS features global indoor penetration and unprecedently low connectivity costs. Existing communication systems (including the cellular approaches of LTE-M and NB-IoT) will not provide the global scale or the required price-points for commercial success.

SUMMARY

The disclosure relates generally to wireless communications and, more particularly, to systems and methods for downlink scheduling.

An illustrated embodiment disclosed herein is a method for downlink scheduling. The method includes scheduling, by a satellite, one or more protocol data units (PDUs) in a slot, determining, by the satellite, whether available capacity of the slot is less than a predetermined threshold, responsive to determining that the available capacity of the slot is not less than the predetermined threshold, scheduling, by the satellite, a second one or more PDUs in the slot, and responsive to determining that the available capacity of the slot is less than that the predetermined threshold, transmitting, by the satellite, the slot to an endpoint. In some embodiments, the one or more PDUs are associated with a first spreading factor (SF). In some embodiments, the first SF is lower than a second SF. In some embodiments, the second one or more PDUs are associated with the second SF.

In some embodiments, the method further includes ranking a plurality of PDUs from a lowest SF to a highest SF, wherein the plurality of PDUs includes the one or more PDUs and the second one or more PDUs. In some embodiments, the method further includes determining whether all PDUs associated with the first SF are scheduled in the slot. In some embodiments, the predetermined threshold is a size of the second one or more PDUs.

In some embodiments, the method further includes calculating a SF for each of a plurality of PDUs, wherein the plurality of PDUs includes the one or more PDUs and the second one or more PDUs. In some embodiments, calculating the SF of each the plurality of PDUs is based on a received power level of a corresponding uplink PDU. In some embodiments, the method further includes updating the SF for each of the plurality of PDUs that is not scheduled in the slot. In some embodiments, the updated SF of each the plurality of PDUs is based on a second received power level of a second corresponding uplink PDU.

Another illustrated embodiment disclosed herein is a method for downlink scheduling. The method includes calculating, by a satellite, a first spreading factor (SF) of a first one or more downlink (DL) protocol data units (PDUs) using a first received power of a first one or more uplink (UL) PDUs, calculating, by the satellite, a second SF of a second one or more DL PDUs using a second received power of a second one or more UL PDUs. In some embodiments, the first SF is lower than the second SF. The method includes scheduling, by the satellite, the first one or more DL PDUs in a slot based on the first SF being lower than the second SF and transmitting, by the satellite, the slot to an endpoint.

In some embodiments, the method further includes determining, by the satellite, whether available capacity of the slot is less than a predetermined threshold. In some embodiments, the method further includes, responsive to determining that the available capacity of the slot is not less than the predetermined threshold, scheduling, by the satellite, the second one or more DL PDUs in the slot. In some embodiments, the method further includes, responsive to determining that the available capacity of the slot is less than that the predetermined threshold, scheduling the second one or more DL PDUs in a second slot transmitted after the slot is transmitted. In some embodiments, the method further includes receiving, by the satellite, from the endpoint, the first one or more uplink (UL) protocol data units (PDUs) at the first received power and the second one or more UL PDUs at the second received power.

Another illustrated embodiment disclosed herein is a system for downlink scheduling. The system includes an endpoint and a satellite. The satellite includes programmed instructions that, when executed, cause the satellite to schedule one or more protocol data units (PDUs) in a slot, determine whether available capacity of the slot is less than a predetermined threshold, responsive to determining that the available capacity of the slot is not less than the predetermined threshold, schedule a second one or more PDUs in the slot, and responsive to determining that the available capacity of the slot is less than that the predetermined threshold, transmit the slot to the endpoint. In some embodiments, the one or more PDUs are associated with a first spreading factor (SF). In some embodiments, the first SF is lower than a second SF. In some embodiments, the second one or more PDUs are associated with the second SF.

In some embodiments, the programmed instructions, when executed, further cause the satellite to rank a plurality of PDUs from a lowest SF to a highest SF, wherein the plurality of PDUs includes the one or more PDUs and the second one or more PDUs. In some embodiments, the predetermined threshold is a size of the second one or more PDUs.

In some embodiments, the programmed instructions, when executed, further cause the satellite to calculate a SF for each of a plurality of PDUs, wherein the plurality of PDUs includes the one or more PDUs and the second one or more PDUs. In some embodiments, calculating the SF of each the plurality of PDUs is based on a received power level of a corresponding uplink PDU. In some embodiments, the programmed instructions, when executed, further cause the satellite to update the SF for each of the plurality of PDUs that is not scheduled in the slot. In some embodiments, the updated SF of each the plurality of PDUs is based on a second received power level of a second corresponding uplink PDU.

DETAILED DESCRIPTION

Figure 1:
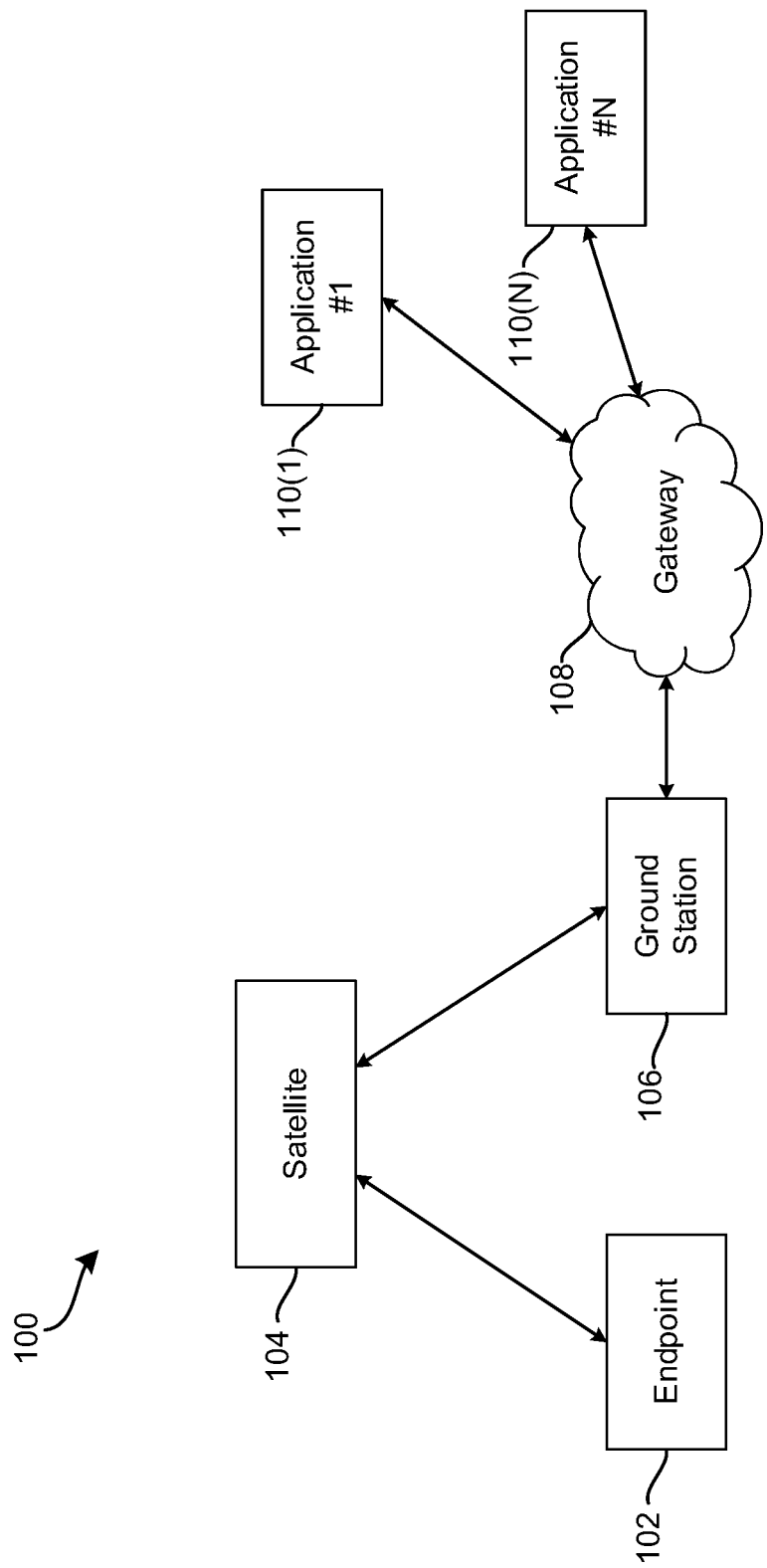
FIG. 1 is an example block diagram of a communication system, in accordance with some embodiments.

One aspect of the disclosure is a frequency diversity scheme that estimates the signal gain or loss of a communication link. In some embodiments of the disclosure, the systems and methods described herein can select a channel for which the communication link has a signal gain greater than a signal gain of any other channel. In some embodiments, the systems and methods described herein can increase a link budget in the presence of Rayleigh fading through frequency diversity.

Another aspect of the disclosure is a system and method for determining a target for sending an uplink transmission. In some embodiments, the system and method can determine, for each downlink transmission, whether the transmission is sent by a tower or satellite. In some embodiments, the system and method can select a target for uplink transmission based on Doppler characteristics of the corresponding downlink transmission. In some embodiments, the system and method can prioritize communication with towers, thus reducing latency, power consumption, and operational costs.

Another aspect of the disclosure is a system and method for performing a power control scheme. In some embodiments, the satellite selects an optimal spreading factor (SF) and the endpoint demodulates all the SFs to determine the signal at the SF computed by the satellite. In some embodiments, the power control scheme optimizes downlink (DL) capacity.

Another aspect of the disclosure is a system and method for recovering a payload encoded by forward error correction. In some embodiments, encoding is done at the endpoint and extra parity PDUs are sent to one or more satellites. In some embodiments, a gateway collects the PDUs tagged with MAC ID and SDU sequence number and when enough PDUs are received the gateway can decode to an original payload. One application is in a handover during transmission of a datagram/SDU/payload.

Another aspect of the disclosure is a system and method for implementing a downlink schedule. In some embodiments, a satellite can select sending physical data units (PDUs) with smallest SFs. Once the satellite has added PDUs of the smallest SF to a slot, the satellite can iteratively increase the SF and add additional PDUs until the slot is full. In some embodiments, such a schedule allows for optimization of DL capacity because the satellite can pack into each frequency slot as efficiently as possible.

Another aspect of the disclosure is a system and method for satellite detection. In some embodiments, an endpoint correlates frames with hypotheses. In some embodiments, the endpoint determines a subset of hypotheses that have strongest correlations for the first frame and the second frame. In some embodiments, the endpoint selects a hypothesis that is in both subsets and has a highest received signal in the second frame among all the hypotheses in both of the first and second subsets. The proposed aspect has a lower detection time than simple thresholding.

Another aspect of the disclosure is a system and method for second derivative compensation. In some embodiments, an endpoint determines a second derivative of a frequency offset based on the measured frequency offset and its first derivative. In some embodiments, the endpoint predicts the frequency offset and its first derivative at a later time based on the calculated second derivative. By more accurately predicting the frequency offset characteristics, the system (e.g., the endpoint or a corresponding satellite) can reduce the search space for the uplink (UL) signal. As a result, the system saves at least one of power, gate count, or field-programmable gate array (FPGA) size/silicon area.

Referring now to FIG. 1, an example communication system 100 is shown. The communication system 100 can include one or more endpoints 102, one or more satellites 104, a ground station 106, a communication gateway 108, and one or more applications 110(1)-110(N) (generally referred to as "application 110"). The one or more endpoints can receive and transmit one or more Service Data Units ("SDUs"). Each SDU can include one or more physical layer Physical Data Units ("PDUs"). Each PDU can include a data stream, data, symbols, and/or bits. In some embodiments, each PDU includes 192 bits totally independent of a spreading factor. Each PDU can include a dedicated (e.g., unicast) data or a broadcast data. Each PDU can have a corresponding spreading factor ("SF").

The one or more endpoints 102 is coupled to the one or more satellites 104 with one or more device links. A device link can be established when an endpoint 102 acquires a satellite 104 downlink signal. The one or more satellites 104 can transmit SDUs and PDUs to, or receive SDUs and PDUs from, the one or more endpoints 102. In some embodiments, the one or more satellites 104 include one or more (e.g., terrestrial) towers. In some embodiments, the one or more towers are separate from the one or more satellites 104.

The one or more satellites 104 is coupled to the ground station 106 with one or more backhaul links. The satellite can process an SDU down to the PDU layer and send the one or more PDUs to the gateway 108 via the ground station 106. The satellite can receive PDUs from the gateway 108 via the ground station 106. The ground station 106 is coupled to the communication gateway 108. The gateway 108 can decode the one or more PDUs to one or more user payloads and can encode the one or more user payloads to the one or more PDUs. The communication gateway 108 is coupled to the one or more applications 110 with one or more data path interfaces.

Figure 2:
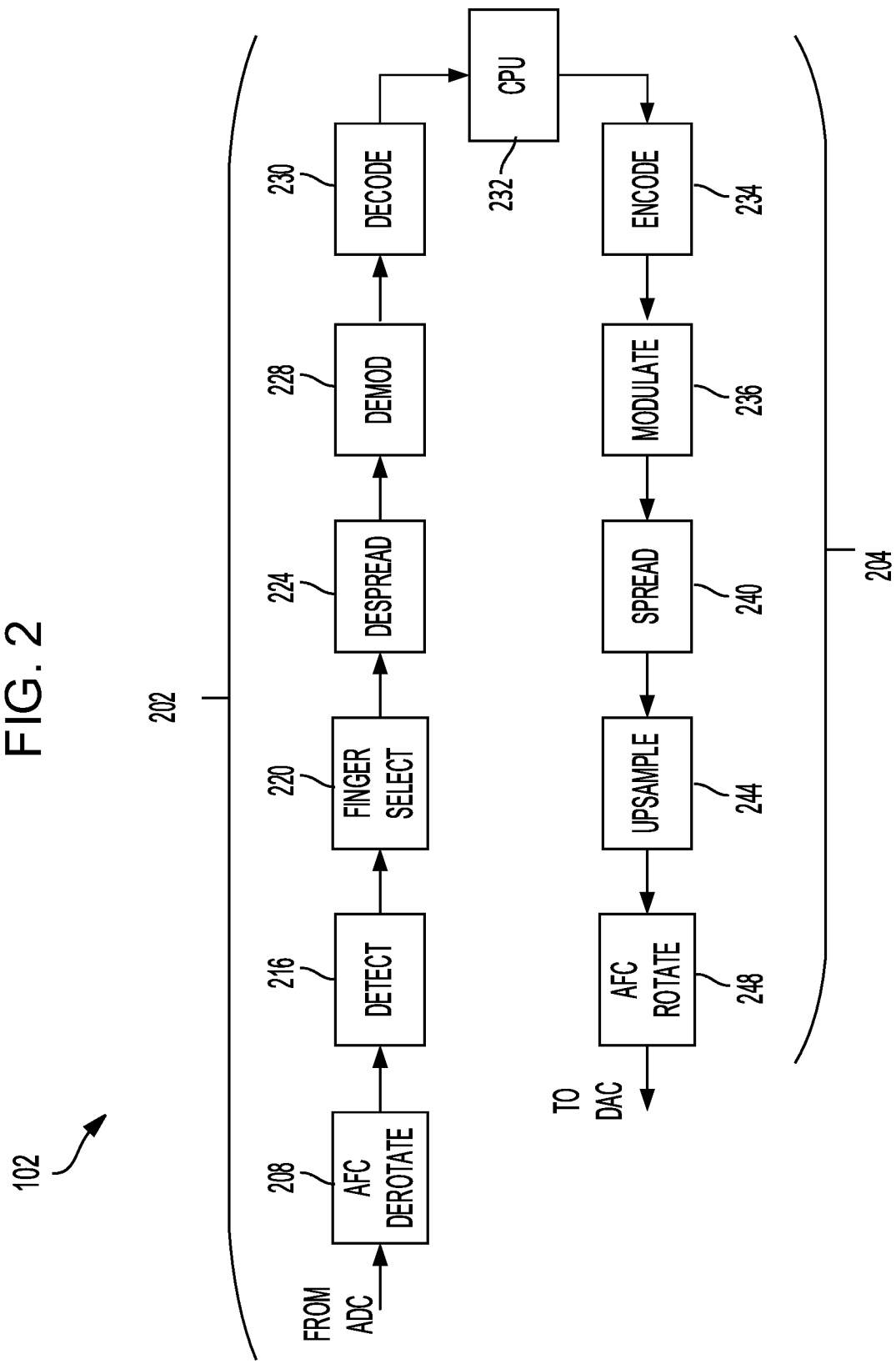
FIG. 2 is an example block diagram of an endpoint, in accordance with some embodiments.

Referring now to FIG. 2, an example block diagram of an endpoint 102 is shown. The endpoint 102 can include a downlink ("DL") path 202 and an uplink ("UL") path 204. The DL path 202 of the endpoint 102 processes PDUs received from the satellite 104 in units called frames. The DL path can include an automatic frequency control ("AFC") 208, a detector 216, a finger selector 220, a despreader 224, a demodulator 228, and a decoder 230. In some embodiments, each of the components of the endpoint 102 may include one or more processing devices (e.g., a digital processor, an analog processor, a digital circuit designed to process information, an analog circuit designed to process information, a state machine, and/or other mechanisms for electronically processing information). The one or more processing devices may include one or more devices executing operations in response to instructions stored electronically on an electronic storage medium.

In some embodiments, the DL path 202 performs timing and frequency acquisition of a DL PDU on a broadcast channel such as a system information block ("SIB") channel and/or a constellation ("CONST") channel. The AFC 208 can receive the broadcast PDU from an analog to digital converter ("ADC"). The AFC 208 explores different Doppler frequency hypotheses (e.g., frequencies, phases, timing). In some embodiments, a Doppler window +/−60 kHz is explored. In some embodiments, each of the hypotheses have a resolution of 244 Hz. In some embodiments, the AFC 208 derotates the broadcast PDU by at least one of a frequency or phase. In some embodiments, each Doppler hypothesis is a frequency version or portion of the broadcast PDU. In some embodiments, the Doppler hypothesis compensates for a Doppler offset frequency or a sum of the Doppler offset frequency and a TCXO error frequency offset. The AFC 208 can include a lookup table ("LUT") and an accumulator having an accumulation rate corresponding to the Doppler hypothesis. A column in the lookup table can be selected for each sample based on an output of the accumulator.

The detector 216 detects (e.g., accumulates, measures, or otherwise determines) a signal (e.g., metric, level, power, energy, received signal, received signal strength, signal-to-noise ratio, etc.) each Doppler hypothesis of the broadcast PDU. In some embodiments, the detector 216 correlates each Doppler hypothesis with a known pseudo noise (PN) sequence to generate a correlated signal and detects each correlated signal. The correlation can be coherent, non-coherent, or a combination thereof. The detector 216 can include a matched filter. The finger selector 220 can rank the Doppler hypotheses based on the detected signal of the Doppler hypothesis. In some embodiments, the finger selector 220 selects N broadcast PDU hypotheses having the highest detected signal. The finger selector 220 can identify (e.g., select, determine, apply, etc.) different timing (e.g., chip timing) hypotheses for each Doppler hypothesis.

The despreader 224 can despread each of the timing hypotheses of each of the Doppler hypotheses of the DL PDU selected by the finger selector 220. The despreader 224 can despread the M×N selected hypotheses of the broadcast PDU from the chip rate to the symbol rate, wherein M is a number of timing hypotheses and N is a number of Doppler hypotheses. The despreader 224 can despread the M×N selected hypotheses by multiplying the hypothesis by a PN sequence and summing the multiplications. The PN sequence may be a Gold code or some other code. The PN sequence may be known a priori. The PN sequence may have a spreading factor ("SF"). The SF may be known a priori. The despreader 224 can include a multiplier having the PN sequence as the second input. The despreader 224 can include an accumulator coupled to the output of the multiplier, and a decision block coupled to the output of the accumulator.

The demodulator 228 can demodulate each of the M×N selected hypotheses. The modulation type being demodulated can include differential phase shift keying ("D-PSK").

In some embodiments, the DL path 202 demodulates DL PDUs (e.g., having dedicated data). The DL path 202 can have similar operations for demodulating a dedicated DL PDU as for acquiring a broadcast DL PDU except for differences described herein. In some embodiments, the Doppler frequency offset and the chip timing of the DL PDU are derived from detecting and/or demodulating the broadcast PDU. The AFC 208 can derotate one dedicated DL PDU reliably. In some embodiments, the detector 216 and finger selector 220 can be bypassed. In some embodiments, the detector 216 can be used to detect auxiliary signals (e.g., sequences) such as a swept synchronization ("sync"). The detection of the swept sync can be used for frequency diversity, which is described herein. The swept syncs can be received as a part of a common frame that includes the dedicated DL PDUs. The despreader 224 can despread the DL PDU with one or more SFs.

The decoder 230 (e.g., Reed-Solomon decoder, Viterbi decoder) receives (e.g., the selected hypothesis of the broadcast (or dedicated) DL PDU (e.g., n encoded symbols, including k information symbols and n-k parity check symbols) from the demodulator 228. In some embodiments, the decoder 230 decodes, forward error corrects, or otherwise recovers the k information symbols from at least a portion of the n encoded symbols. In some embodiments, the decoder 230 uses "m" previous broadcast PDUs to decode the current broadcast PDU. In some embodiments, the decoder includes a demultiplexer, a plurality of parallel forward error correction (FEC) decoders coupled to the demultiplexer, and a multiplexer.

The decoder 230 can deinterleave the broadcast (or dedicated) DL PDU. The decoder 230 can check the cyclical redundancy check ("CRC"). The decoder 230 can identify a DL PDU corresponding to the correct Doppler hypothesis and the correct chip timing hypothesis. The identified broadcast PDU can be identified as having a correct CRC. The decoder 230 can send the identified broadcast PDU to the CPU 232.

The UL path can include an encoder 234, a modulator 236, a spreader 240, an upsampler 244, and an AFC 248. In some embodiments, the UL path 202 transmits UL PDUs (e.g., broadcast data to multiple satellites or dedicated data to one satellite). The encoder 234 can encode the UL PDU using FEC codes, thus increasing the UL PDU from k information symbols to n encoded symbols. The encoder 234 can encode and interleave the UL PDU. The modulator 236 can modulate the UL PDU with a modulation scheme such as D-PSK. The spreader 240 can spread the UL PDU from a symbol rate to a chip rate using a PN sequence. The upsampler 244 can upsample the UL PDU. The AFC 248 can rotate the UL PDU with a frequency offset.

In some embodiments, the satellite 104 can include components similar to the endpoint 102, such as the components with respect to FIG. 2.

Figure 3:
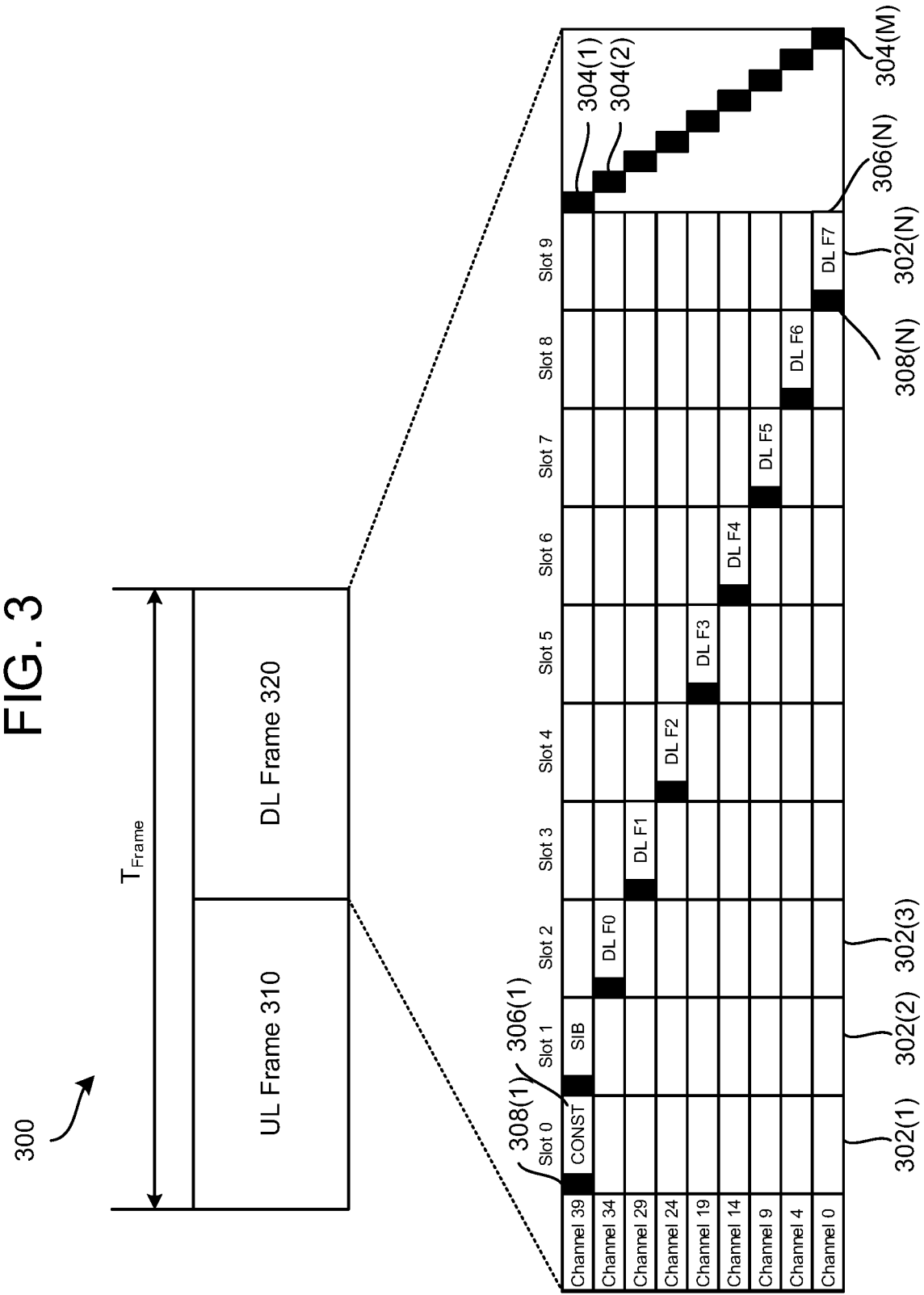
FIG. 3 is an example downlink frame, in accordance with some embodiments.

Referring now to FIG. 3, an example frame 300 is shown. The frame 300 includes uplink (UL) frame 310 and downlink (DL) frame 320. Each of UL frame 310 and DL frame 320 includes slots 302(1)-(N) (generally referred to as a slot 302). In some embodiments, each slot is assigned to, allocated to, transmitted at, or otherwise corresponds to a resource (e.g., channel) in time, frequency, or both. For example, slot 302(2) can correspond to channel 39 and slot 302(3) can correspond to channel 34. Each slot 302 can include one or more PDUs 306 and a slotted synchronization (sync) 308 (e.g., slotted sync signal). Thus, for example, slot 302(1) includes one or more PDUs 306(1) and a slotted sync signal 308(1). Each of the PDUs 306 can include data, a Viterbi tail, a CRC, a MAC ID, a MAC header, and/or data. Broadcast channels can be used to transmit broadcast PDUs (e.g., CONST or SIB) and dedicated channels can be used to transmit dedicated PDUs (e.g., DL F0, DL F1, etc.) In some embodiments, each of the UL frame 310 and the DL frame 320 includes swept syncs 304(1)-304(M) (collectively referred to herein as swept syncs 304 or swept sync signals 304). In some embodiments, only the DL frame 320 includes swept syncs 304. The swept syncs 304 can be used to determine a channel for the endpoint 102 to transmit UL data on.

Figure 4:
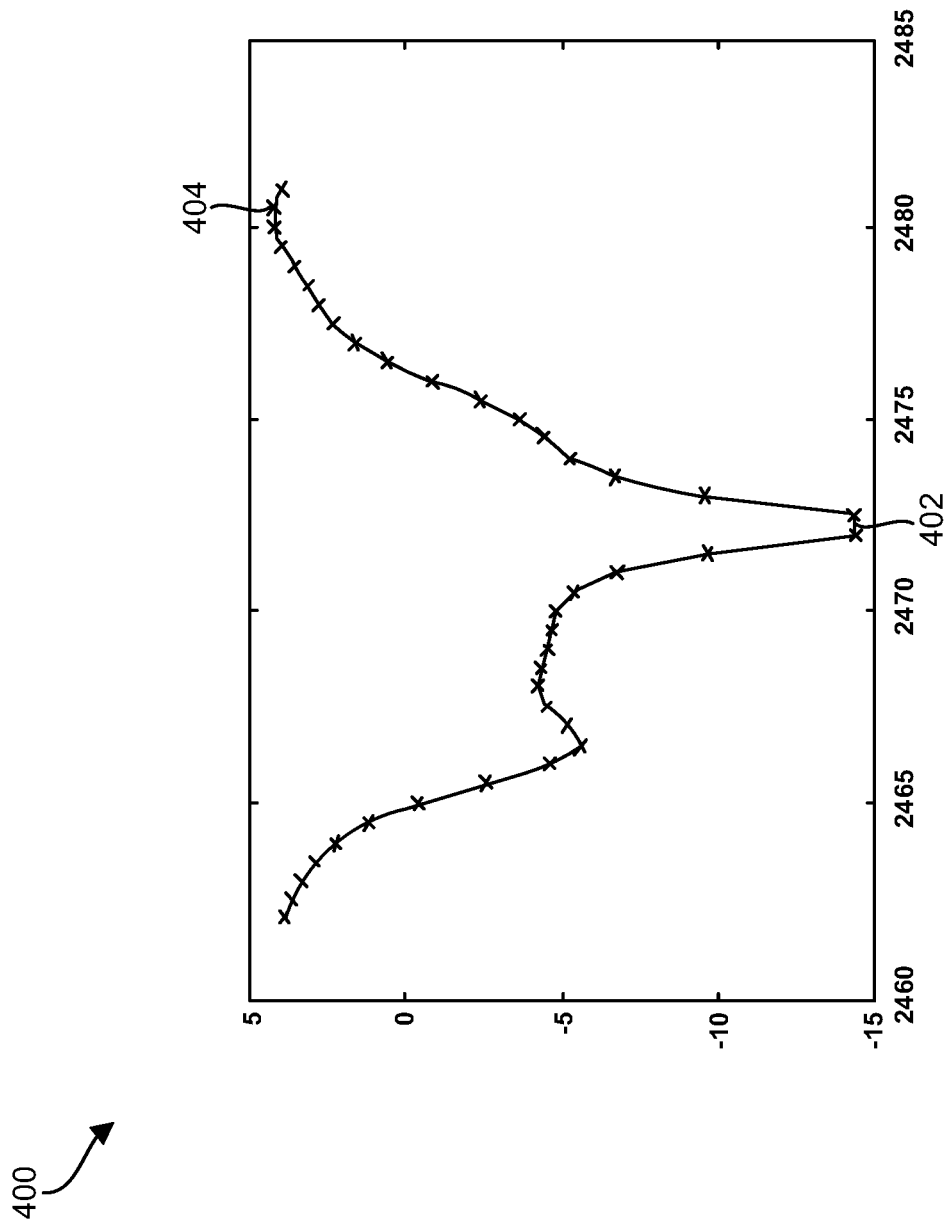
FIG. 4 is an example plot of Rayleigh fading, in accordance with some embodiments.

Referring now to FIG. 4, an example plot 400 of Rayleigh fading is shown. Rayleigh fading typically occurs when communication signals are wirelessly transmitted in an indoor environment. The x-axis of the plot 400 represents the frequency of transmission between the endpoint 102 and the satellite 104. The y-axis of the plot 400 represents the signal transmission gain. Each of the channels in a frequency band are plotted at their corresponding transmission frequencies and corresponding signal gains. As a result of the Rayleigh fading, some channels, such as channel 402, may experience signal loss compared to a case of no Rayleigh fading. Other channels, such as channel 404, may experience signal gain compared to a case of no Rayleigh fading.

Figure 5:
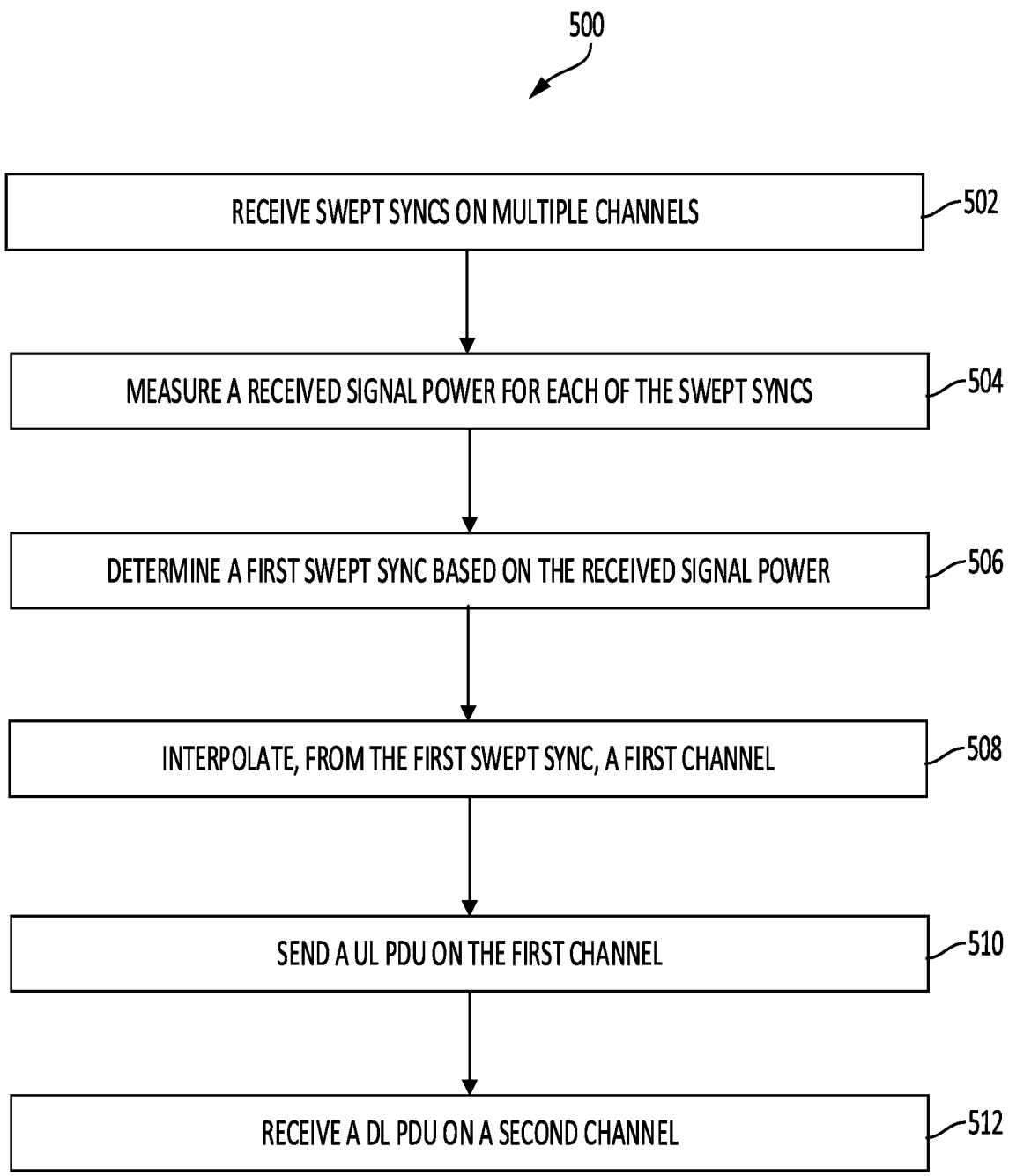
FIG. 5 is an example method for employing frequency diversity, in accordance with some embodiments.

Referring now to FIG. 5, an example method 500 for employing frequency diversity is shown, in accordance with some embodiments. The method 500 may be implemented using, or performed by, one or more of the components of the endpoint 102, which is detailed herein with respect to FIG. 1 and FIG. 2. Additional, fewer, or different operations may be performed in the method 500 depending on the embodiment.

At block 502, the endpoint 102 receives the multiple swept syncs 304 transmitted by the satellite 104 on a DL frame such as the DL frame 320 of FIG. 3. Each of the swept syncs 304 can be transmitted on a different channel (e.g., at a different frequency). In some embodiments, there is one swept sync 304 for each channel. In some embodiments, the swept syncs 304 are at the end of the DL frame.

At block 504, the endpoint 102 measures (e.g., detects) the received power of the multiple swept syncs 304. In some embodiments, the power is the average energy during a predetermined time interval. In some embodiments, the power is the peak energy during the predetermined time interval. The AFC 208 may derotate each of the swept syncs 304 appropriately (e.g., to a baseband frequency). The detector 216 may detect energy in each of the swept syncs 304 (e.g., at the baseband frequency). In some embodiments, the AFC 208 derotates the swept sync 304 signals one at a time, and the detector 216 detects each of the swept sync 304 signals one at a time. In some embodiments, the swept sync 304 signals may be stored in a buffer prior to being sent to the AFC 208.

At block 506, the endpoint 102 determines (e.g., identifies, selects, etc.) a first swept sync based on the received power. In some embodiments, the endpoint 102 determines a first swept sync having a highest received power (e.g., signal strength, power, or other metric) among all of the swept syncs 304.

At block 508, the endpoint 102 interpolates (e.g., maps, links, etc.) from the swept sync to a first channel for sending an UL PDU. In some embodiments, the endpoint 102 interpolates from the plurality of channels used for swept syncs 304 to a plurality of channels used for UL PDUs (e.g., including the first channel). For example, there are 9 swept sync channels and 16 UL PDU channels. Thus, swept sync channels may not align with the UL PDU channels. In some embodiments, the first channel that is interpolated from the swept sync channel overlaps with the swept sync channel. In some embodiments, the first channel that is interpolated from the swept sync channel does not overlap with the swept sync channel.

At block 510, the endpoint 102 sends an UL PDU or signal on the first channel. In some embodiments, the satellite 104 receives the UL PDU from the endpoint 102 and other UL PDUs from other endpoints. In some embodiments, the UL PDUs from the other endpoints are on other channels. In some embodiments, the UL PDU may include a MAC ID or an SDU sequence number. The satellite 104 may determine the source endpoint of each signal. For example, the satellite 104 may extract the MAC ID or the SDU sequence number from the UL PDU and map the MAC ID or the SDU sequence number to the endpoint 102.

At block 512, the endpoint 102 receives a DL PDU 306 or signal on a second channel based on the first channel. In some embodiments, the second channel is closer to the first channel than any other of the DL channels. In some embodiments, the second channel is overlapping in frequency with the first channel or separate in (e.g., non-overlapping with) frequency from the first channel. In some embodiments, the satellite 104 selects the second channel. In some embodiments, the endpoint 102 and the satellite 104 leverage (e.g., exploit) channel reciprocity. In some embodiments, the second channel may have a same or substantially similar Rayleigh fading signal gain as the first channel.

In some embodiments, blocks 502-512 may be repeated such that the first channel is continuously updated. For example, the blocks 502-510 may occur during frame N and the block 512 may occur during frame N+1. In some embodiments, each of the blocks may occur during every frame. In some embodiments, the endpoint 102 receives a second plurality of swept syncs in a same DL frame (e.g., frame N+1) as the DL PDU. In some embodiments, the endpoint 102 measures a second received power for each of the second plurality of swept syncs. In some embodiments, the endpoint 102 determines a third channel corresponding to a second swept sync having the highest measured power in frame N+1. In some embodiments, the second swept sync having the highest measured power in frame N+1 is on a different channel than the swept sync having the highest measured power in the DL frame (e.g., frame N).

Figure 6:
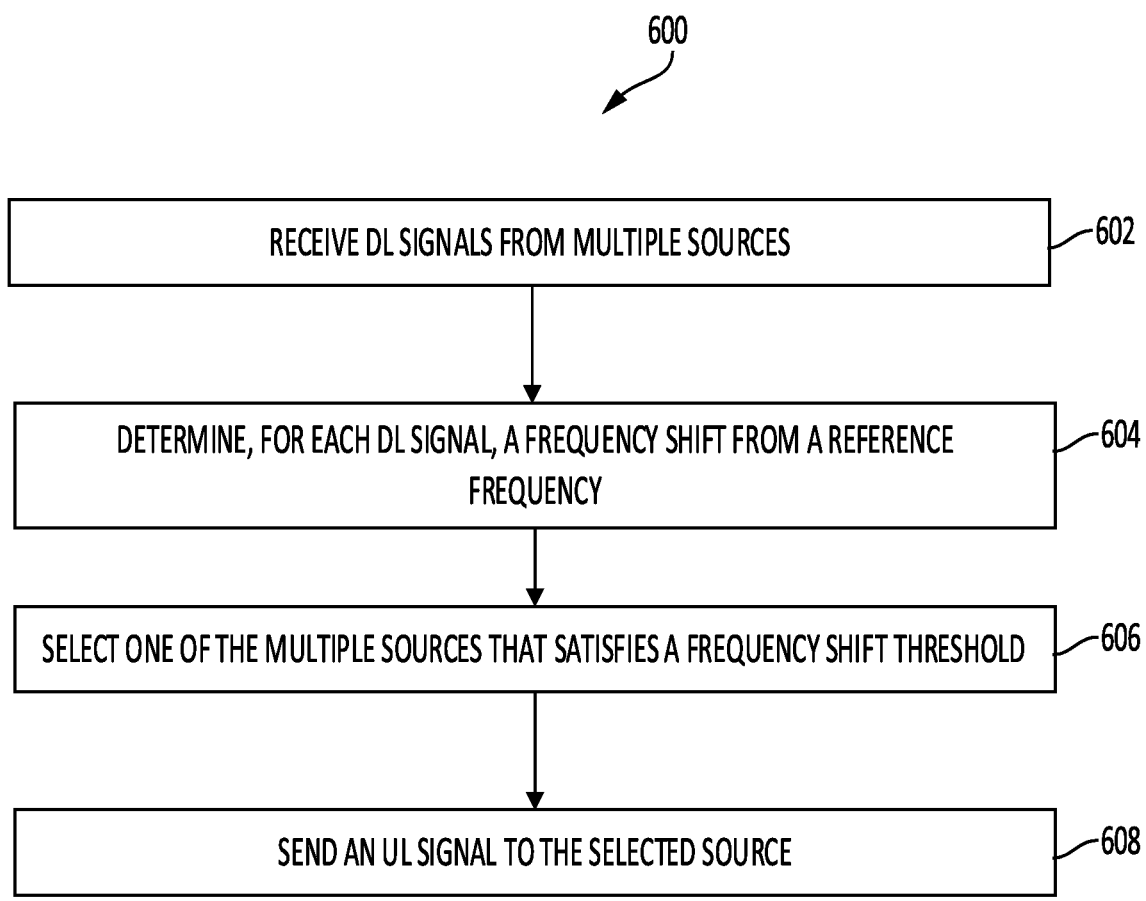
FIG. 6 is an example method for determining a target for an uplink transmission, in accordance with some embodiments.

Referring now to FIG. 6, an example method 600 for determining a target for an uplink transmission is shown, in accordance with some embodiments. The method 600 may be implemented using, or performed by, one or more of the components of the endpoint 102, which is detailed herein with respect to FIG. 1 and FIG. 2. Additional, fewer, or different operations may be performed in the method 600 depending on the embodiment.

At block 602, the endpoint 102 can receive frames, such as the frame 300, from multiple sources. Each frame includes one or more DL signals. In some embodiments, the one or more DL signals include at least one DL PDU, such as PDU 306(N), and one swept sync, such as swept sync 304(M). The multiple sources may include one or more satellites 104 and one or more towers.

At block 604, the endpoint 102 can determine, for each DL PDU from each of the multiple sources, a frequency shift or offset from a reference frequency. The endpoint 102 can know (e.g., determine) a priori what the expected frequency of a DL PDU is. The endpoint 102 (e.g., the components of the endpoint 102) uses the swept sync as a proxy for the DL PDU. The AFC 208 can derotate the swept sync by the expected frequency. The detector 216 can measure the power or energy in multiple frequency bands. In some embodiments, the detector 216 can measure energy within a predetermined frequency range such as −60 kHz to 60 kHz, and the range can be partitioned into the multiple frequency bands. The detector 216 can determine that the frequency shift is the center frequency of the frequency band having the most power or energy. In some embodiments, the demodulator 228 may demodulate the energy and check the CRC to determine whether the energy is that of a swept sync.

At block 606, the endpoint 102 can select one of the multiple sources to be the target for transmitting a UL signal (e.g., a UL PDU and/or acknowledge of the DL signal). The endpoint 102 can select one of the sources whose swept sync satisfies a frequency shift threshold. For example, the endpoint 102 can select one of the sources whose swept sync has a frequency offset between −1 kHz and 1 kHz. In some embodiments, satisfying the frequency shift threshold may indicate that the source is a tower. In some embodiments, the endpoint 102 may determine that more than one of the sources satisfies the frequency shift threshold. In some embodiments, the endpoint 102 may use a secondary metric to select a source from the group of sources that satisfies the frequency shift threshold. For example, the secondary metric may be the received power. In some embodiments, the endpoint 102 can select one of the sources whose swept sync satisfies a received power threshold.

At block 608, the endpoint 102 may send the UL signal to the source that is selected to be the target. In some embodiments, the endpoint 102 leverages channel reciprocity by selecting an UL channel based on (e.g., closest to, most closely mapped) the channel at which the DL frame was received. In some embodiments, the endpoint 102 may apply the same frequency shift to the UL signal that was identified in the swept sync received from the selected source.

Figure 7:
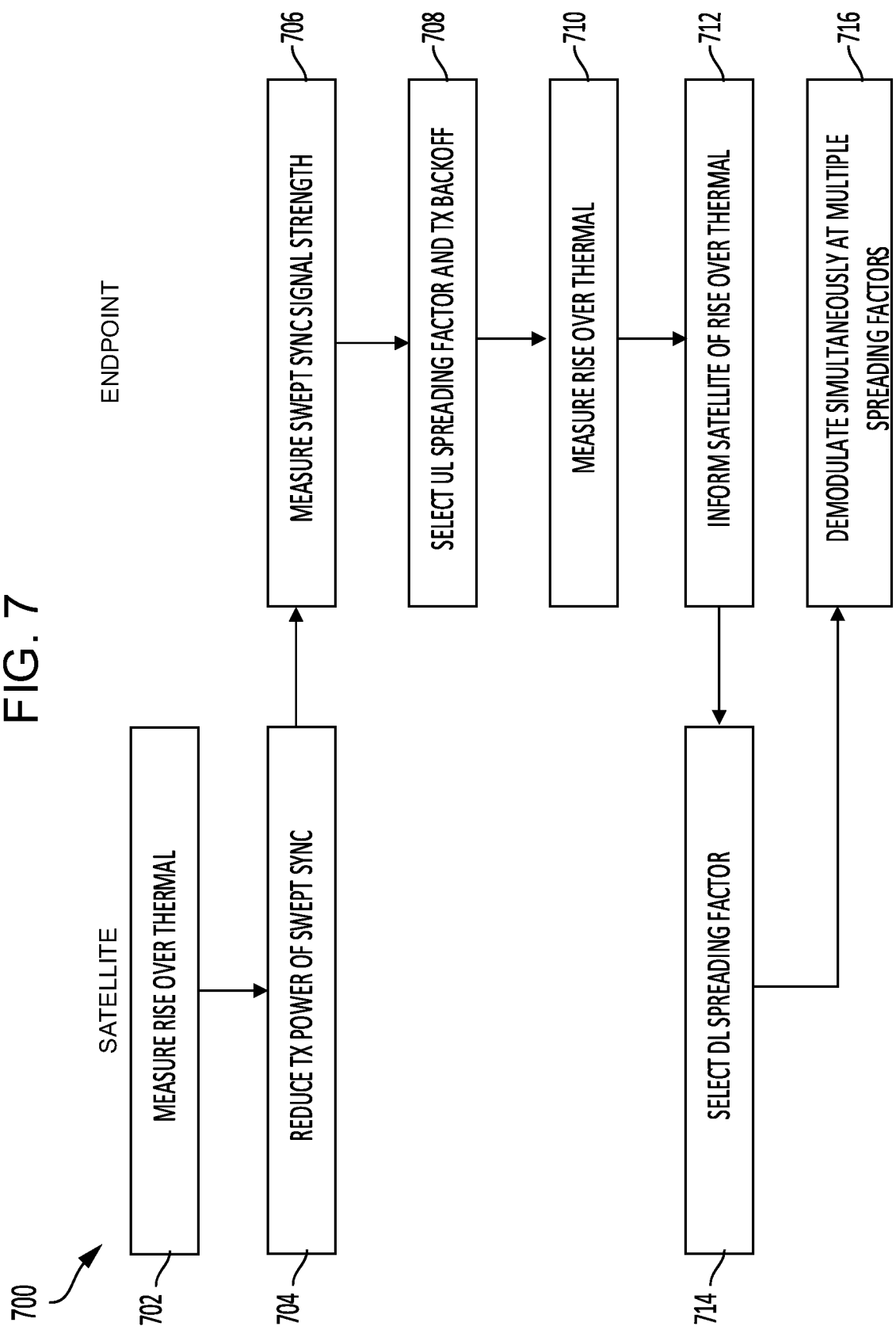
FIG. 7 is an example method for performing a power control scheme, in accordance with some embodiments.

Referring now to FIG. 7, an example method 700 for performing a power control scheme is shown, in accordance with some embodiments. The method 700 may be implemented using, or performed by, one or more of the endpoint 102 and the satellite 104, which are detailed herein with respect to FIG. 1 and FIG. 2. Additional, fewer, or different operations may be performed in the method 700 depending on the embodiment.

At block 702, the satellite 104 measures, for each uplink channel, a rise-over-thermal (e.g., at the satellite 104 location). The rise-over-thermal indicates an amount of noise and interference from endpoints and external sources. In some embodiments, the rise-over-thermal varies across the uplink channels. The rise-over-thermal measurement can be an absolute measurement. In some embodiments, a thermal noise floor is known a priori. In some embodiments, the satellite 104 computes a rise-over-thermal delta as a difference of the rise-over-thermal and the thermal noise floor.

At block 704, the satellite 104 reduces a DL Tx power for a portion (e.g., swept syncs 304) of each of the DL frames, such as the DL frame 320 with respect to FIG. 3, to be transmitted to one or more endpoints such as endpoint 102. The remaining portion(s) (e.g., DL PDUs, slotted syncs, etc.) of the DL frame are referred to as the full power portion of the DL frame. In some embodiments, the reduction in the Tx power of the reduced power portion of the DL frame is based on the rise-over-thermal measurement of the uplink channel corresponding to (e.g., nearest the downlink channel of) the reduced power portion of the DL frame. For example, if the rise-over-thermal is 3 dB above the noise floor, then the satellite reduces the Tx power by 3 dB. In some embodiments, the satellite 104 reduces the Tx power by backing off Tx gain. In some embodiments, the satellite 104 broadcasts the first DL frame to all endpoints in range and the endpoint 102 receives the first DL frame.

At block 706, the endpoint 102 measures a received signal strength indicator (RSSI) of the reduced power portion of the DL frame (e.g., after the endpoint 102 receives the DL frame from the satellite 104). In some embodiments, the measured RSSI is lower due to the satellite 104 backing off the DL Tx power.

At block 708, the endpoint 102 selects a UL SF and a UL Tx backoff. In some embodiments, the endpoint transmits a first UL frame, such as the UL frame 310 with respect to FIG. 3, at a target UL Tx power by using the selected UL SF and UL Tx backoff. In some embodiments, the endpoint 102 selects the UL SF and the Tx backoff based on the measured RSSI. In some embodiments, the endpoint 102 initially sets the SF to a maximum permissible SF (e.g. SF 1024) and the Tx backoff to 0 dB.

In some embodiments, the endpoint 102 determines a first predetermined threshold and a second predetermined threshold based on the RSSI. In some embodiments, the endpoint 102 reduces the UL SF until the first predetermined threshold is satisfied. In some embodiments, the first predetermined threshold is that a predicted UL Tx power is within 3 dB of the target UL Tx power. In some embodiments, the SF is in steps that results in 3 dB changes in UL Tx power. In some embodiments, the endpoint 102, responsive to satisfying the first predetermined threshold, increases the Tx backoff until the second predetermined threshold is satisfied. In some embodiments, Tx backoff is in steps of 0.1 dB. In some embodiments, the second predetermined threshold is that a predicted UL Tx power is equal to, substantially equal to, or within 0.1 dB, the target UL Tx power.

At block 710, the endpoint 102 measures a rise-over-thermal of the reduced power portion of the DL frame (e.g., at the endpoint 102 location). In some embodiments, the endpoint 102 measures the rise-over-thermal for a designated channel at which data (e.g., PDUs) is communicated between the endpoint 102 and the satellite 104. In some embodiments, the rise-over-thermal at the endpoint 102 location is different from (e.g., greater than or less than) the rise-over-thermal at the satellite 104 location. In some embodiments, the rise-over-thermal at the endpoint 102 location is written to or stored in a PDU 306 of the first UL frame.

At block 712, the endpoint 102 informs (e.g., transmits to, etc.) the satellite 104 of at least one of the measured rise-over-thermal at the endpoint 102 location or the UL SF. In some embodiments, at least one of the endpoint 102's rise-over-thermal or the UL SF is written to a PDU 306 of the first UL frame. In some embodiments, the endpoint 102 transmits the unicast, first UL frame and the satellite 104 receives the unicast, first UL frame.

At block 714, the satellite 104 selects, calculates, or otherwise determines a DL SF for one or more DL PDUs 306 of a second DL frame. In some embodiments, the satellite 104 selects the DL SF based on at least one of the satellite 104's measured rise-over-thermal (e.g., measured in 702), the endpoint 102's measured rise-over-thermal (e.g., measured in 710), or the UL SF. In some embodiments, the satellite 104 computes a first delta between the satellite 104's measured rise-over-thermal and the endpoint 102's measured rise-over-thermal. In some embodiments, the first delta is computed as a first Tx power of the reduced power portion of the DL frame and a second Tx power of the UL frame. For example, the first delta can be converted to a first SF or SF delta (e.g., a 3 dB power delta is the same as 2x SF). In some embodiments, the satellite 104 selects a DL SF is equal to a function (e.g., sum, difference, product, quotient, etc.) of the first SF delta and the UL SF. In some embodiments, the satellite 104 transmits a unicast, second DL frame and the endpoint 102 receives the unicast, second DL frame. In some embodiments, the satellite 104 selects a Tx backoff for transmitting the DL PDUs 306 of the second DL frame.

At block 716, the endpoint 102 simultaneously demodulates the second DL frame at multiple spreading factors. In some embodiments, the endpoint 102 demodulates each of the DL PUDs 306 in the second DL frame using a code (e.g., one of the Gold Codes). Each code corresponds to one of the multiple SFs. In some embodiments, the endpoint 102 successfully demodulates a DL PDU 306 that is demodulated with a first code corresponding to a first SF. In some embodiments, the endpoint 102 identifies correct CRC bits in a demodulated DL PDU 306 that is demodulated with a first code corresponding to a first SF. In some embodiments, the endpoint 102 determines the DL SF to be the first SF.

Figure 8:
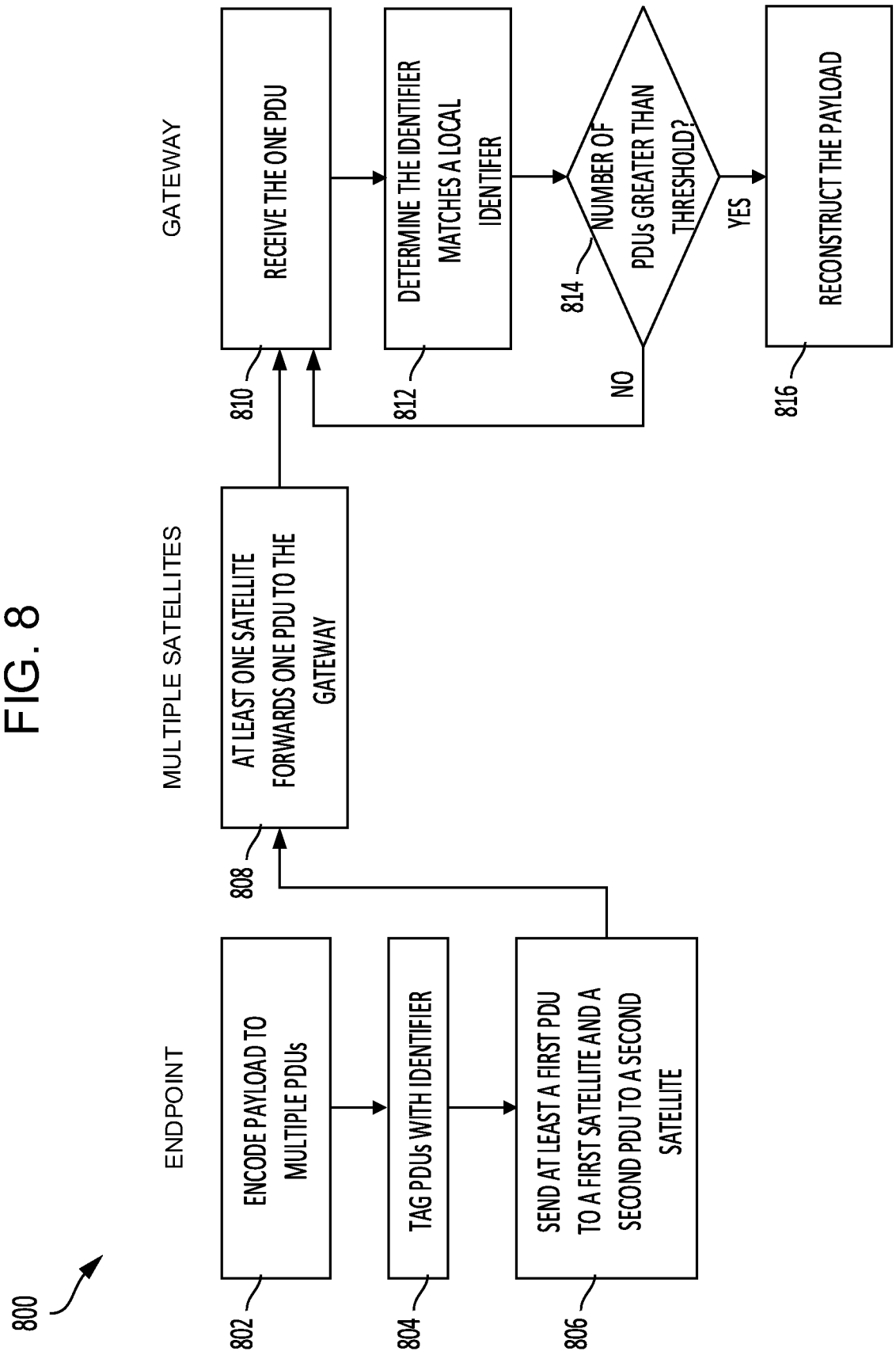
FIG. 8 is an example method for recovering a payload encoded by forward error correction, in accordance with some embodiments.

Referring now to FIG. 8, an example method 800 for recovering a payload encoded by forward error correction is shown. The method 800 may be implemented using, or performed by, one or more of the endpoint 102, the multiple satellites 104, or the gateway 108, which are detailed herein with respect to FIG. 1 and FIG. 2. Additional, fewer, or different operations may be performed in the method 800 depending on the embodiment.

At block 802, the endpoint 102 encodes a payload (e.g., payload, datagram, SDU, etc.) to multiple (e.g., N) PDUs. The endpoint 102 uses forward error correcting (FEC), such as FEC codes, erasure codes, Reed-Solomon codes, to encode the payload. The multiple PDUs include original data of the payload and redundant data, e.g., parity bits and/or symbols. In some embodiments, the multiple PDUs includes at least one parity PDU. In some embodiments, the at least one parity PDU includes a portion of the redundant data. In some embodiments, the at least one parity PDU includes a portion of the payload. In some embodiments, each of the multiple PDUs are transmitted on a unicast (e.g., dedicated) channel.

At block 804, the endpoint 102 tags, assigns, or otherwise associates each of the multiple PDUs with a same (e.g., one or more) identifier(s). In some embodiments, the identifier includes a MAC ID and/or an SDU sequence number. At block 806, the endpoint 102 sends the multiple PDUs, including a first PDU and a second PDU, to multiple satellites 104 (e.g., the endpoint 102 sends the first PDU to a first satellite 104 and the second PDU to a second satellite 104). In some embodiments, prior to sending the multiple PDUs, the endpoint 102 modulates and/or spreads the multiple PDUs.

At block 808, at least one of the multiple satellites 104 (e.g., the first satellite 104) forwards one of the multiple PDUs (e.g., the first PDU) to the gateway 108. In some embodiments, at least one of the multiple satellites 104 despreads and/or demodulates the one of the multiple PDUs. At block 810, the gateway 108 receives (e.g., via the ground station 106) at least one of the multiple PDUs.

At block 812, the gateway 108 determines whether the identifier matches a local identifier. In some embodiments, the gateway 108 compares each of multiple local identifiers to the identifier until finding a match. In some embodiments, the multiple local identifiers are located or stored in a data structure, memory, solid state drive, or other storage medium. In some embodiments, in response to not finding a match, the gateway 108 discards the PDU. In some embodiments, responsive to determining that the gateway 108 determines that the identifier matches the local identifier, the method 800 proceeds to block 814.

At block 814, the gateway 108 determines whether a number of PDUs (e.g., received and tagged with identifiers matching the local identifier) satisfies (e.g., is greater than) a predetermined threshold number of PDUs. Responsive to the number of PDUs not being greater than the predetermined threshold, the method 800 returns to block 810 (e.g., receives one or more additional PDUs from the multiple satellites 104). Responsive to the number of PDUs satisfying the predetermined threshold, the method 800 proceeds to block 816.

At block 816, the gateway 108 decodes, reconstructs, or otherwise recovers the payload from the number of PDUs. In some embodiments, the gateway decodes the payload from a first number of PDUs that is less than a second number of PDUs that the payload was encoded to (e.g., at block 802).

Figure 9:
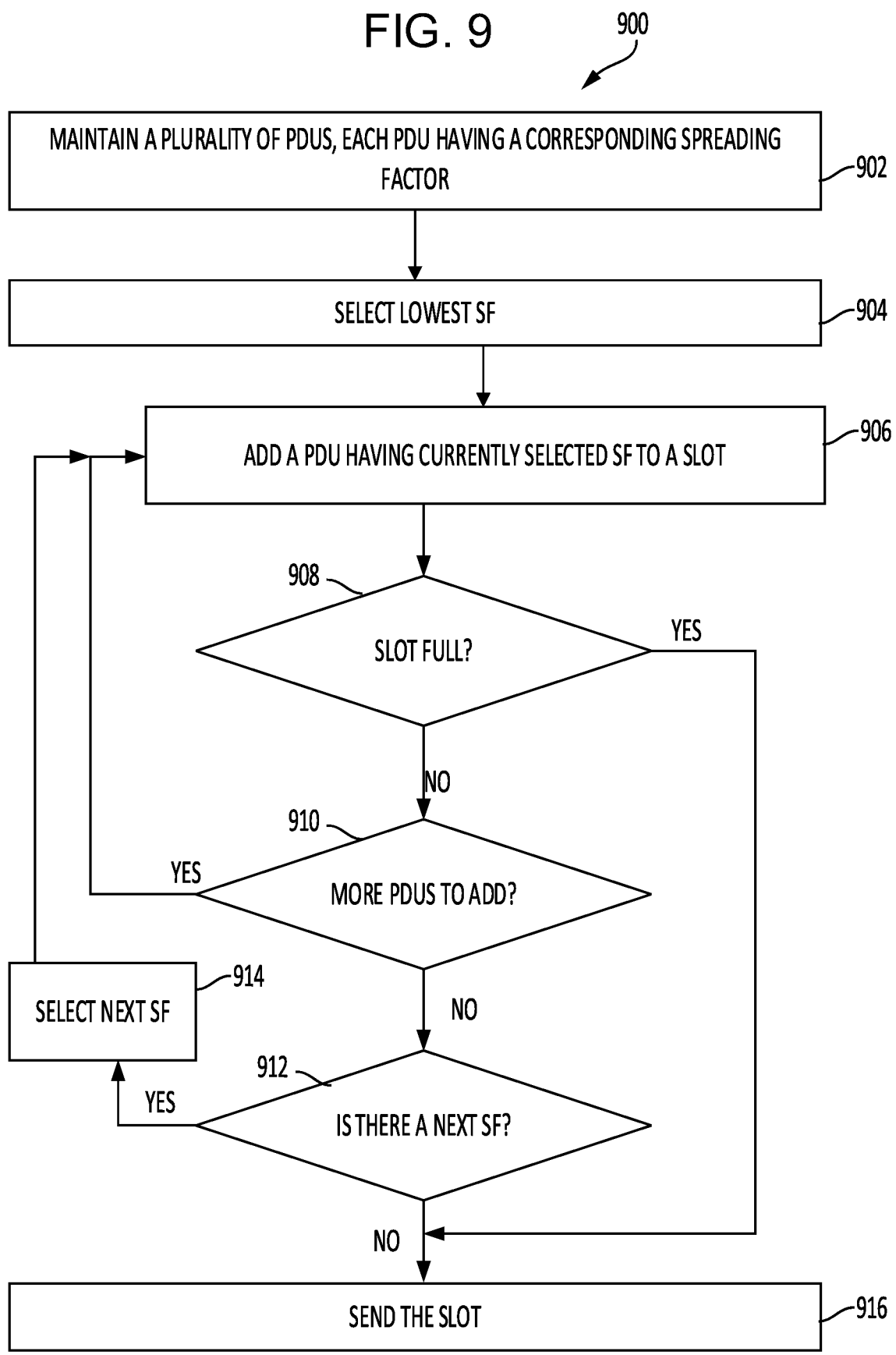
FIG. 9 is an example method for implementing a downlink schedule, in accordance with some embodiments.

Referring now to FIG. 9, an example method 900 for implementing a downlink schedule is shown. The method 900 may be implemented using, or performed by, a satellite 104, which is detailed herein with respect to FIG. 1 and FIG. 2. Additional, fewer, or different operations may be performed in the method 900 depending on the embodiment.

At block 902, the satellite 104 maintains a plurality of PDUs 306 (e.g., DL PDUs 306), each PDU 306 having a corresponding spreading factor (SF). In some embodiments, each PDU 306 corresponds to an endpoint 102. More than one PDU 306 can correspond to a same endpoint. The satellite 104 may separate (e.g., group, partition, or otherwise arrange) the PDUs into groups based on which endpoint 102 each PDU 306 corresponds to. In some embodiments, the satellite 104 assigns, allocates, or otherwise corresponds each endpoint 102 to a slot 302 in a next DL frame (e.g., the DL frame 320). In some embodiments, the satellite 104 determines which of the PDUs 306 to transmit in the slot 302 for the corresponding endpoint 102. The PDUs 306 which are not transmitted in the slot 302 can be transmitted in a second slot 302 in a later DL frame.

In some embodiments, the satellite 104 calculates the SF to use for each DL PDU 306. The calculation of a PDU's 306 SF may be based on a received power level of a corresponding UL PDU. In some embodiments, the satellite spreads each DL PDU 306 using its corresponding SF. In some embodiments, the satellite 104 separates the PDUs 306 into subsets based on what endpoint 102 each of the PDUs 306 are destined (e.g., targeted, assigned) for. In some embodiments, the satellite 104 ranks or sorts the plurality of DL PDUs 306 (e.g., each of the subsets of DL PDUs 306) from lowest SF to highest SF. The satellite 104 may store the PDUs and the ranking of the PDUs in a memory or storage associated with the satellite 104 or other component in the communication system 100. In some embodiments, each different SF corresponds to a different (e.g., additional) overhead (e.g., overhead bits) in the PDUs corresponding to that SF.

At block 904, the satellite 104 selects a lowest SF (e.g., a SF is lower than SFs of all other PDUs maintained by the satellite 104 and destined for a specific endpoint 102, a minimum SF, etc.). At block 906, the satellite 104 adds, assigns, packs, picks, or otherwise corresponds a PDU 306 having the currently selected SF to the slot 302. Thus, in the first iteration, the currently selected SF is the lowest SF. In some embodiments, multiple PDUs 306 have the selected SF. In some embodiments, the satellite 104 randomly picks (e.g., selects) one of the PDUs 306 having the selected SF.

At block 908, the satellite 104 determines whether the available capacity of the slot 302 is less than a predetermined threshold. The predetermined threshold may be a fixed number of bits and/or a number of bits sufficient to add a next PDU 306 to the slot 302. For example, the satellite 104 determines whether the slot 302 is full. In another example, the predetermined threshold is a fixed percentage between 0 and 100 or a fixed amount.

If the satellite 104 determines that the available capacity of the slot 302 is not less (e.g., greater) than the predetermined threshold, then at block 910, the satellite 104 determines whether there are more PDUs 306 (e.g., corresponding to the endpoint 102) having the selected SF to add to the slot 302. If there are more PDUs (e.g., available PDUs) having the selected SF to add to the slot 302, then the method returns to block 906.

If there are no more PDUs 306 having the selected SF to add to the slot 302, or, in some embodiments, if there are more PDUs 306 having the selected SF that have not been scheduled, then, at block 912, the satellite 104 determines whether there are PDUs 306 associated with a next SF (e.g., a greater SF, a SF that is greater than an SF of a most recently added PDU but lower than SFs of other remaining PDUs, etc.). In some embodiments, the PDUs 306 and the corresponding SFs are stored (e.g., saved, written to, kept) in a lookup table (LUT). In some embodiments, the LUT is sorted in order of SF. In some embodiments, finding a next SF includes incrementing an index, reading an SF value, and repeating until the SF value is greater than a previous SF value or the index is greater than a size of the number of PDUs.

If there is a next SF, then, at block 914, the satellite 104 selects the next SF. After selecting the next SF, the method returns to block 906. If there is not a next SF, or if the satellite 104 determines (at block 908) that the available capacity of the slot 302 is less than the second predetermined threshold, then, at block 916, the satellite 104 sends the slot 302 to the endpoint 102.

In some embodiments, the satellite 104 updates (e.g., re-calculates) the SFs of the PDUs 306 that are not added to the slot 302. In some embodiments, the update occurs prior to determining what PDUs 306 to add to a second slot 302. In some embodiments, the update is based on receiving updated receive power levels of the corresponding UL PDUs. In some embodiments, the received power level of the corresponding UL PDUs has increased since the transmission of the slot 302 (e.g., because of a less noisy or attenuated communication path between the satellite 104 and an endpoint 102 corresponding to the slot 302), thereby resulting in an updated SF that is lower than the original SF.

Figure 10:
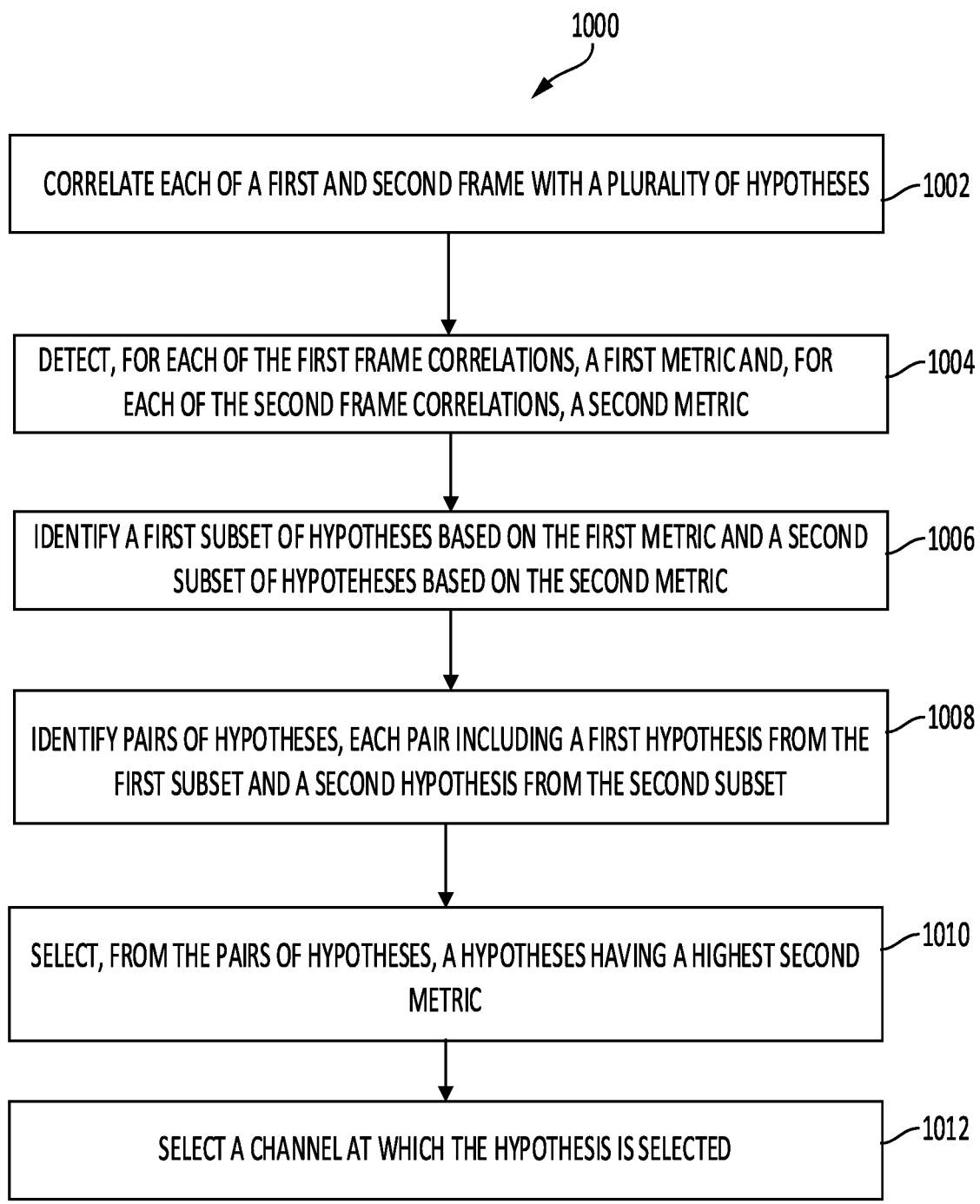
FIG. 10 is an example method for processing satellite detection, in accordance with some embodiments.

Referring now to FIG. 10, an example method 1000 for satellite detection is shown. The method 1000 may be implemented using, or performed by, the endpoint 102 and/or one or more of the components of the endpoint 102 (e.g., the AFC derotator 208, the detector 216, the finger selector 220), which are detailed herein with respect to FIG. 1 and FIG. 2. Additional, fewer, or different operations may be performed in the method 1000 depending on the embodiment.

At block 1002, the endpoint 102 correlates a first frame, such as the DL frame 320, with multiple, different hypotheses and correlates a second frame, such as the DL frame 320, with the multiple, different hypotheses (e.g., the endpoint 102 explores different hypotheses of the first frame and the second frame). The first and second frames are received by the endpoint 102 and from a satellite 104. In some embodiments, correlating the first frame includes correlating a first frame component (e.g., swept sync, slotted sync, or PDU in the first frame) and correlating the second frame includes correlating a second frame component (e.g., swept sync, slotted sync, or PDU in the second frame). Examples of swept sync, slotted sync, and PDU are swept sync 304(M), slotted sync 308(N), and PDU 306(N), respectively. In some embodiments, correlating the first frame component and the second frame component includes at least one of shifting or derotating the frequency (e.g., the AFC) of the first frame component and the second frame component, shifting (e.g., offsetting, or otherwise adjusting) the chip timing of the first frame component and the second frame component, or shifting or derotating the phase of the first frame component and the second frame component by at least one of a frequency, chip timing, or phase of a hypothesis. Each hypothesis may include, or be associated with, at least one of a different frequency offset, different chip timing, or different phase.

At block 1004, the endpoint 102 detects (e.g., measures or otherwise determines), for each correlation of the first frame with a hypothesis, a first metric and, for each correlation of the second frame, a second metric (collectively, "a metric"). In some embodiments, the metric is an energy metric such as received signal strength, signal-to-noise ratio, etc. In some embodiments, the endpoint 102 detects the metric of the DL PDU, the swept sync, or the slotted sync.

At block 1006, the endpoint 102 identifies a first subset of hypotheses based on the first metric and a second subset of hypotheses based on the second metric. In some embodiments, the endpoint 102 identifies a first subset of hypotheses having a highest first metric and a second subset of hypotheses having a highest second metric (e.g., or otherwise satisfies a first predetermined or dynamic threshold). Thus, in some embodiments, each hypothesis in the first subset has a higher first metric than a first metric of any hypothesis not in the first subset. For example, if hypothesis A has an RSSI of −100 dBm, hypothesis B has an RSSI of −110 dBm, and hypothesis C has an RSSI of −120 dBm, and the top hypotheses with the two highest first metric are identified as the first subset, then the endpoint 102 identifies hypotheses A and B as the first subset. Similarly, each hypothesis in the second subset has a higher second metric than a second metric of any hypothesis not in the second subset. In some embodiments, the endpoint 102 identifies 8 hypotheses for each of the first and second subsets. In some embodiments, at least some of the identified hypotheses of the first subset do not match to or otherwise correspond with any of the identified hypotheses of the second subset.

At block 1008, the endpoint 102 identifies pairs of hypotheses. Each pair includes a first hypothesis from the first subset and a second hypothesis from the second subset. In some embodiments, the first hypothesis is same as the second hypothesis. For example, if the first subset includes hypotheses A, B, and C, and the second subset includes hypotheses A, B, and D, then the pairs of hypotheses includes A and B.

In some embodiments, the first hypothesis of the first frame is within a predetermined distance (e.g., range) of the second hypothesis of the second frame. That is, a first one or more parameters (e.g., frequency, chip timing, or phase) of the first hypothesis are within one or more predetermined distances of a second one or more parameters of the second hypothesis. In some embodiments, the predetermined distance between a first frequency parameter of the first hypothesis and a second frequency parameter of the second hypothesis is −100 Hz to 100 Hz. In some embodiments, the difference between the first hypothesis and the second hypothesis is due to at least one of frequency drift, timing drift, or phase drift. In some embodiments, the endpoint 102 matches (e.g., matches, links, or maps, groups, includes in the pairs of hypotheses) the first hypothesis to the second hypothesis based on determining that the first hypothesis (e.g., the parameters thereof) is within the distance of the second hypothesis (e.g., the parameters thereof). For example, if a first hypothesis of the first subset has a frequency of 1 kHz, and the second hypothesis of the second subset has a frequency of 1.1 kHz, and all other parameters are the same, and 1.1 kHz is within the determined distance of 1 kHz, then the endpoint 102 matches the first hypothesis to the second hypothesis (e.g., includes the first and second hypotheses in the pairs of hypotheses described above). In another example, if the first subset includes hypotheses A, B, C, and D, and the second subset includes hypotheses A', B', C', and E, wherein each of A', B', and C' are within a predetermined range of A, B, and C, respectively, and E is not within a predetermined range of D, then the pairs of hypotheses includes A and A', B and B', and C and C'.

In some embodiments, blocks 1002-1008 are performed for each channel at which the first frame and the second frame are transmitted by the satellite 104. In some embodiments, the identified subsets of hypotheses are not the same across the channels for which blocks 1002-1008 are performed.

At block 1010, the endpoint 102 selects, from the pairs of hypotheses, a hypothesis (e.g., a target hypothesis) based on the second metric. In some embodiments, the endpoint 102 selects, from the pairs of hypotheses, a hypothesis having a highest second metric (e.g., or otherwise satisfies a second predetermined or dynamic threshold). Thus, in some embodiments, the selected hypothesis has a higher second metric than a second metric of any hypothesis in the pairs of hypotheses. In some embodiments, the hypothesis is selected from the second frame (e.g., from one of the second hypotheses). At block 1012, the endpoint 102 selects a channel (e.g., for transmission) at which the hypothesis is selected. For example, the endpoint 102 selects a channel at which the hypothesis has the highest second metric. In some embodiments, the endpoint 102 supports further communications with the satellite 104 using the selected hypothesis and the selected channel.

Figure 11:
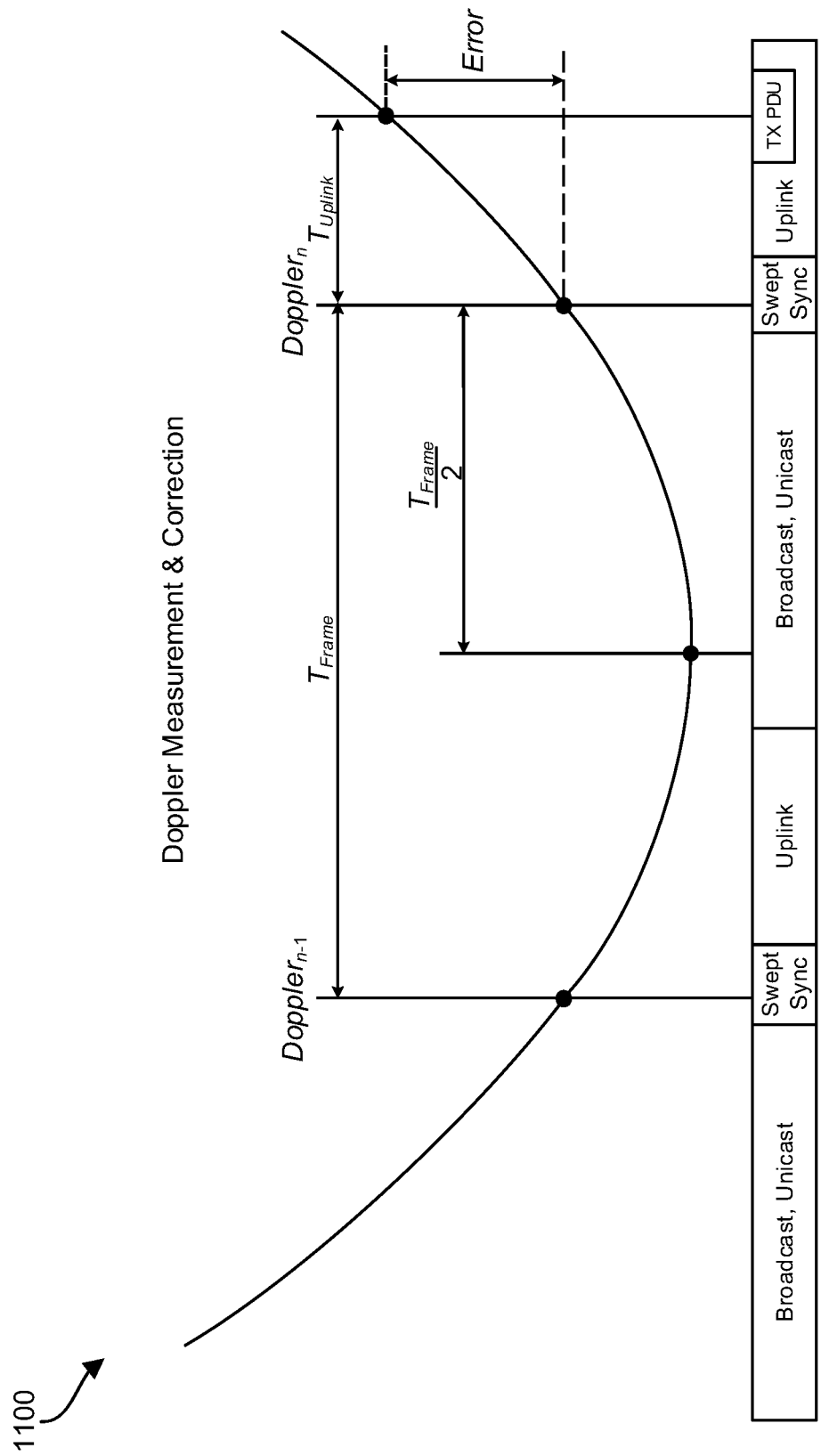
FIG. 11 is an example timing diagram for Doppler frequency offset, in accordance with some embodiments.

Referring now to FIG. 11, an example timing diagram 1100 for Doppler frequency offset is shown. The x-axis is time and the y-axis is the Doppler frequency offset. The endpoint 102 includes a processor. The processor has programmed instructions to determine, or have a priori knowledge of, a satellite 104's altitude (e.g., an altitude at which it's launched).

The endpoint 102 receives one or more swept syncs from the satellite 104. For example, the endpoint 102 receives a first swept sync (e.g., a first instance of swept sync 304(1) in a first frame) from the satellite 104 at time $Doppler_{n-1}$ and a second swept sync (e.g., a second instance of swept sync 304(1) in a second frame) from the satellite 104 at time $Doppler_n$. The processor has programmed instructions to measure or otherwise determine one or more frequencies (e.g., Doppler frequencies) associated with the one or more swept syncs. The processor has programmed instructions to determine the Doppler frequency offset (e.g., an initial Doppler frequency offset) and the first derivative of the Doppler frequency offset (e.g., an initial first derivative of the Doppler frequency offset) based on the one or more swept syncs (e.g., based on receiving the swept syncs, based on determining one or more frequencies associated with the one or more swept syncs). In some embodiments, the Doppler frequency offset is the measured frequency. In some embodiments, the Doppler frequency is a difference of the measured frequency and a predetermined frequency. In some embodiments, the Doppler frequency offset is for a different time (e.g., a time at which the endpoint 102 is sending a Tx PDU) to the satellite 104. In some embodiments, the endpoint 102 determines the Doppler frequency offset is for a different time by estimating (e.g., extrapolating) the frequency from the times $Doppler_{n-1}$ and $Doppler_n$ to the different time.

The processor has programmed instructions to calculate (e.g., compute, determine) a second derivative of the Doppler frequency. The second derivative of the Doppler frequency is calculated based on one or more of the Doppler frequency offset, the first derivative of the Doppler frequency offset, and the altitude of the satellite. In some embodiments, the second derivative of the Doppler frequency is calculated using a polynomial fit. In some embodiments, the second derivative of the Doppler frequency is calculated using an orbital model that is a function of the Doppler frequency offset and, the first derivative of the Doppler frequency offset, and an altitude of a satellite 104 in communication with the endpoint 102.

The processor has programmed instructions to calculate (e.g., compute, determine, etc.) a delta for each of the Doppler frequency offset and the first derivative of the Doppler frequency offset. The deltas are calculated based on the calculated second derivative of the Doppler frequency. In some embodiments, the equations for calculating the Doppler frequency offset delta and the first derivative of the Doppler frequency offset delta are:

$$\text{Doppler frequency offset delta} = 0.5 * A\left(\left[\frac{T_F}{2} + T_{UL}\right]^2 - \left[\frac{T_F}{2}\right]^2\right)$$

$$\text{First derivative of Doppler frequency offset delta} = A\left(\frac{T_F}{2} + T_{UL}\right)$$

$T_F$ is the frame duration between the first swept sync at $Doppler_{n-1}$ and the second swept sync at $Doppler_n$. Tut is a time delta from a time at which the second swept sync at $Doppler_n$ was received by the endpoint to the time of a Tx PDU (e.g., an UL PDU equivalent of PDU 306(N), a middle of the Tx PDU, an UL PDU, a middle of the UL PDU), of the UL frame is transmitted by the endpoint. In some embodiments, the Tut depends on which slot of the UL the Tx PDU is in (e.g., allocated to).

In some embodiments, the processor has programmed instructions to update (compensate, correct, adjust, predict) the Doppler frequency offset and the first derivative of the Doppler frequency offset. The processor has programmed instructions to determine (a) the updated Doppler frequency offset as a function (e.g., sum, difference, etc.) of the initial Doppler frequency offset and the Doppler frequency offset delta and (b) the updated first derivative of the Doppler frequency offset as a function of the initial first derivative of the Doppler frequency offset and the first derivative of the Doppler frequency offset delta. In some embodiments, the updated Doppler frequency offset and the updated first derivative of the Doppler frequency offset are determined for a time when the endpoint 102 sends the Tx PDU to the satellite 104.

Figure 12:
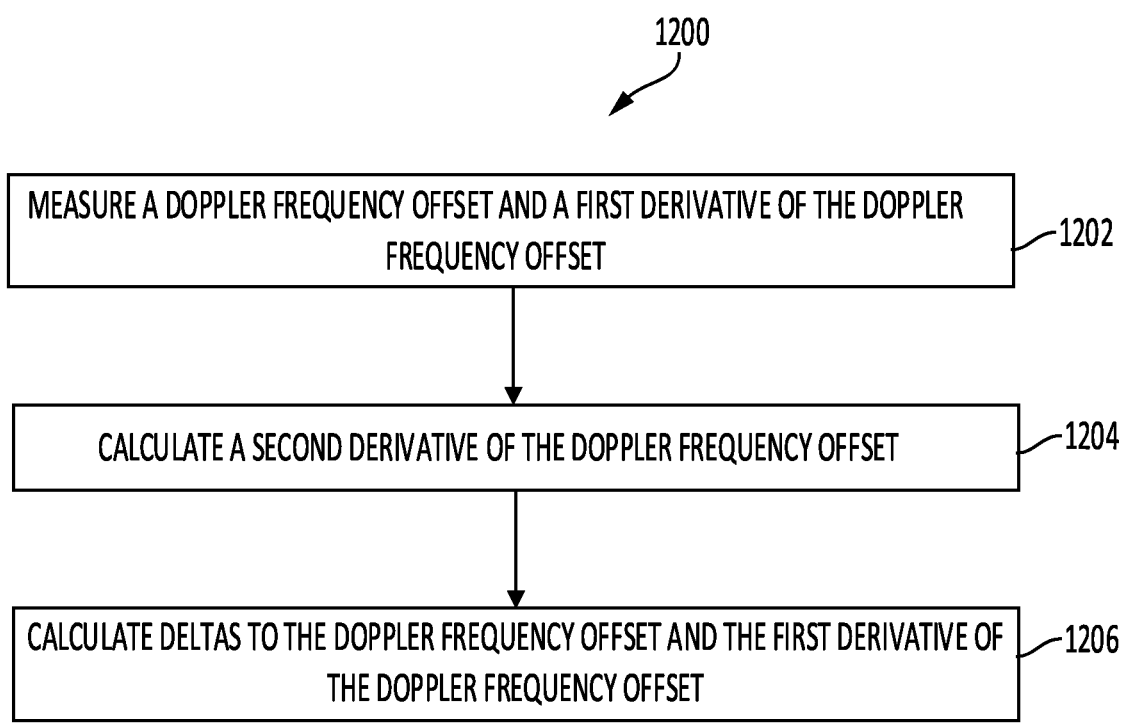
FIG. 12 is an example method for second derivative compensation, in accordance with some embodiments.

Referring now to FIG. 12, an example method 1200 for second derivative compensation is shown. The method 1200 may be implemented using, or performed by, an endpoint 102, which is detailed herein with respect to FIG. 1 and FIG. 2. Additional, fewer, or different operations may be performed in the method 1200 depending on the embodiment.

At block 1202, the endpoint 102 measures a Doppler frequency offset and a first derivative of the Doppler frequency offset. At block 1204, the endpoint 102 calculates a second derivative of the Doppler frequency offset. In some embodiments, the endpoint 102 calculates the second derivative of the Doppler frequency using an orbital model that is a function of the Doppler frequency offset and, the first derivative of the Doppler frequency offset, and an altitude of a satellite 104 in communication with the endpoint 102. At block 1206, the endpoint calculates a first delta and a second delta to the Doppler frequency offset and the first derivative of the Doppler frequency offset, respectively. In some embodiment, the endpoint adds the first delta to the Doppler frequency offset and the second delta to the first derivative of the Doppler frequency offset.

In some embodiments, the methods 500-1000 and 1200 may be implemented in one or more processing devices (e.g., a digital processor, an analog processor, a digital circuit designed to process information, an analog circuit designed to process information, a state machine, and/or other mechanisms for electronically processing information). The one or more processing devices may be associated with one or more of the endpoint 102, the satellite 104, the ground station 106, or the gateway 108. The one or more processing devices may include one or more devices executing some or all of the operations of the methods 500-1000 and 1200 in response to instructions stored electronically on an electronic storage medium. The one or more processing devices may include one or more devices configured through hardware, firmware, and/or software to be specifically designed for execution of one or more of the operations of the methods 500-1000 and 1200.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A method comprising:
   scheduling, by a satellite, one or more protocol data units (PDUs) in a slot, wherein the one or more PDUs are associated with a first spreading factor (SF), wherein the first SF is lower than a second SF;
   determining, by the satellite, whether available capacity of the slot is less than a predetermined threshold;
   responsive to determining that the available capacity of the slot is not less than the predetermined threshold, scheduling, by the satellite, a second one or more PDUs in the slot, wherein the second one or more PDUs are associated with the second SF; and
   responsive to determining that the available capacity of the slot is less than that the predetermined threshold, transmitting, by the satellite, the slot to an endpoint.

2. The method of claim 1, further comprising ranking a plurality of PDUs from a lowest SF to a highest SF, wherein the plurality of PDUs includes the one or more PDUs and the second one or more PDUs.

3. The method of claim 1, further comprising determining whether all PDUs associated with the first SF are scheduled in the slot.

4. The method of claim 1, wherein the predetermined threshold is a size of the second one or more PDUs.

5. The method of claim 1, further comprising calculating a SF for each of a plurality of PDUs, wherein the plurality of PDUs includes the one or more PDUs and the second one or more PDUs.

6. The method of claim 5, wherein calculating the SF of each the plurality of PDUs is based on a received power level of a corresponding uplink PDU.

7. The method of claim 5, further comprising updating the SF for each of the plurality of PDUs that is not scheduled in the slot.

8. The method of claim 7, wherein the updated SF of each the plurality of PDUs is based on a second received power level of a second corresponding uplink PDU.

9. A method comprising:
   calculating, by a satellite, a first spreading factor (SF) of a first one or more downlink (DL) protocol data units (PDUs) using a first received power of a first one or more uplink (UL) PDUs;
   calculating, by the satellite, a second SF of a second one or more DL PDUs using a second received power of a second one or more UL PDUs, wherein the first SF is lower than the second SF;
   scheduling, by the satellite, the first one or more DL PDUs in a slot based on the first SF being lower than the second SF; and
   transmitting, by the satellite, the slot to an endpoint.

10. The method of claim 9, further comprising determining, by the satellite, whether available capacity of the slot is less than a predetermined threshold.

11. The method of claim 10, further comprising, responsive to determining that the available capacity of the slot is not less than the predetermined threshold, scheduling, by the satellite, the second one or more DL PDUs in the slot.

12. The method of claim 10, further comprising, responsive to determining that the available capacity of the slot is less than that the predetermined threshold, scheduling the second one or more DL PDUs in a second slot transmitted after the slot is transmitted.

13. The method of claim 9, further comprising receiving, by the satellite, from the endpoint, the first one or more uplink (UL) protocol data units (PDUs) at the first received power and the second one or more UL PDUs at the second received power.

14. A system comprising an endpoint and a satellite, wherein the satellite includes programmed instructions that, when executed, cause the satellite to:
   schedule one or more protocol data units (PDUs) in a slot, wherein the one or more PDUs are associated with a first spreading factor (SF), wherein the first SF is lower than a second SF;
   determine whether available capacity of the slot is less than a predetermined threshold;
   responsive to determining that the available capacity of the slot is not less than the predetermined threshold, schedule a second one or more PDUs in the slot, wherein the second one or more PDUs are associated with the second SF; and
   responsive to determining that the available capacity of the slot is less than that the predetermined threshold, transmit the slot to the endpoint.

15. The system of claim 14, wherein the programmed instructions, when executed, further cause the satellite to rank a plurality of PDUs from a lowest SF to a highest SF, wherein the plurality of PDUs includes the one or more PDUs and the second one or more PDUs.

16. The system of claim 14, wherein the predetermined threshold is a size of the second one or more PDUs.

17. The system of claim 14, wherein the programmed instructions, when executed, further cause the satellite to calculate a SF for each of a plurality of PDUs, wherein the plurality of PDUs includes the one or more PDUs and the second one or more PDUs.

18. The system of claim 17, wherein calculating the SF of each the plurality of PDUs is based on a received power level of a corresponding uplink PDU.

19. The system of claim 17, wherein the programmed instructions, when executed, further cause the satellite to update the SF for each of the plurality of PDUs that is not scheduled in the slot.

20. The system of claim 19, wherein the updated SF of each the plurality of PDUs is based on a second received power level of a second corresponding uplink PDU.

* * * * *